United States Patent
Nims

(10) Patent No.: US 8,333,549 B2
(45) Date of Patent: Dec. 18, 2012

(54) AIR CYCLE MACHINE TURBINE OUTLET HEATED DIFFUSER

(75) Inventor: Bob Nims, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 1219 days.

(21) Appl. No.: 12/140,911

(22) Filed: Jun. 17, 2008

(65) Prior Publication Data
US 2009/0308076 A1 Dec. 17, 2009

(51) Int. Cl.
F04D 31/00 (2006.01)
F25D 9/00 (2006.01)

(52) U.S. Cl. .................. 415/116; 415/211.2; 62/402

(58) Field of Classification Search .................. 415/116, 415/144, 211.2; 62/86, 87, 88, 401, 402
See application file for complete search history.

(56) References Cited

U.S. PATENT DOCUMENTS

| 3,083,546 | A | | 4/1963 | Turek |
| 4,209,993 | A | * | 7/1980 | Rannenberg ................ 62/80 |
| 4,580,406 | A | * | 4/1986 | Nims .................. 62/87 |
| 5,214,935 | A | * | 6/1993 | Brunskill ................ 62/402 |
| 6,216,981 | B1 | | 4/2001 | Helm |
| 6,408,641 | B1 | * | 6/2002 | Skur, III ................ 62/401 |
| 2002/0121103 | A1 | * | 9/2002 | Udobot et al. ................ 62/402 |

FOREIGN PATENT DOCUMENTS
EP 586619 B1 12/1996

* cited by examiner

Primary Examiner — Ninh H Nguyen
Assistant Examiner — Joshua R Beebe
(74) Attorney, Agent, or Firm — Shimokaji & Assoc., PC

(57) ABSTRACT

The turbine outlet heated diffuser may include a cavity positioned immediately downstream of an air cycle machine turbine. The turbine outlet heated diffuser may be designed to prevent or reduce ice formation at the turbine outlet by heating the diffuser wall. The cavity may receive a heated flow from an air cycle machine compressor discharge and provide a cavity outlet flow to a turbine inlet plenum. The design of the heated diffuser is such to minimize the cycle performance impact that results from the addition of an air cycle machine icing protection feature.

18 Claims, 2 Drawing Sheets

AIR CYCLE MACHINE TURBINE OUTLET HEATED DIFFUSER

BACKGROUND OF THE INVENTION

The present invention generally relates to air cycle machines and, more particularly, to turbine outlet heated diffusers for air cycle machines.

A conventional air cycle machine (ACM) may be incorporated into an aircraft's environmental control system (ECS). The ACM may include a compressor operationally connected to a turbine and may compress and expand pre-conditioned engine bleed air.

In some ECS, such as those that employ a high-pressure water separation concept, the ducting just downstream of the radial turbine wheel of the ACM is susceptible to ice formation due to the extremely cold temperatures coming out of the turbine. This ice formation can be especially harmful to the ACM because it can grow back into the rotating radial turbine blades, causing the turbine blades to break and/or the turbine end journal bearings to fail because of rotor dynamic excitations as a result of the turbine wheel contacting the ice. This problem has been addressed with mixed results.

One common approach with respect to minimizing turbine icing problems is to extend the turbine inlet plenum in such a way it incorporates the diffuser structure just beyond the radial turbine outlet. In this configuration, the turbine inlet air provides the heat source to the turbine outlet section just beyond the end of the turbine wheel. But because the heating of the diffuser wall occurs with warm (and not hot) turbine inlet air it is common to put a step right at the end of the turbine wheel instead of incorporating an aerodynamic optimum turbine outlet diffuser. The step allows some ice to form, but because the turbine inlet air is greater than 32° F., the interface between the ice and the metal will get warm enough to have the ice fall off before it is thick enough to get into the turbine wheel. Unfortunately, this approach has resulted in a reduction of the turbine aerodynamic performance because of less than ideal turbine outlet geometry.

Another common approach has been to bring hot air over into a cavity at the turbine outlet area but then have this high pressure, high temperature flow exit directly into the turbine outlet. This results in a significant overall thermodynamic loss in the air conditioning system cycle because this flow had entered the cavity at high pressure and exits into the low pressure turbine outlet. This flow essentially has bypassed the turbine stage where the useful expansion of this flow is lost to the thermodynamic cycle. In addition, this special hot anti-icing flow is introduced in to the very cold turbine outlet where added heat is not desirable and results in further degradation to the air conditioning system performance.

Other solutions have included the delivery of a heated air flow to ice protecting features on the ACM in a number of different ways. Unfortunately, these solutions have required complicated plumbing schemes, which have been difficult to manufacture. Often, these protection features are not placed optimally for icing protection and often result in less than optimum turbine outlet diffusing structures.

As can be seen, there is a need for ACM ice protection that does not have a significant impact to the overall thermodynamic performance of the ECS. Specifically, ACM icing protection is needed that does not affect the ECS cycle performance by poor system design, does not result in a reduction in the turbine stage aerodynamic performance and is simple, inexpensive and easy to manufacture.

SUMMARY OF THE INVENTION

In one aspect of the present invention, an apparatus for a turbine comprises a diffuser structure; a cavity at least partially defined by the diffuser structure, the cavity positioned radially outward from and towards an outlet of the turbine; at least one cavity inlet opening in flow communication with the cavity; and at least one cavity outlet opening in flow communication with the cavity.

In another aspect of the present invention, an apparatus for an air cycle machine comprises an annular cavity positioned radially outward from a turbine of the air cycle machine; and a fluid supply line positioned between and in flow communication with the annular cavity and a compressor discharge of the air cycle machine.

In a further aspect of the present invention, a method of reducing ice formation for a turbine comprises the steps of positioning a turbine outlet heated diffuser downstream of the turbine; passing a supply of heated flow into a cavity of the turbine outlet heated diffuser such that at least a portion of a radially inner wall surface of the turbine outlet heated diffuser is heated and such that a cavity outlet flow is produced; and passing the cavity outlet flow into an inlet plenum of the turbine.

These and other features, aspects and advantages of the present invention will become better understood with reference to the following drawings, description and claims.

DETAILED DESCRIPTION OF THE INVENTION

Figure 1:
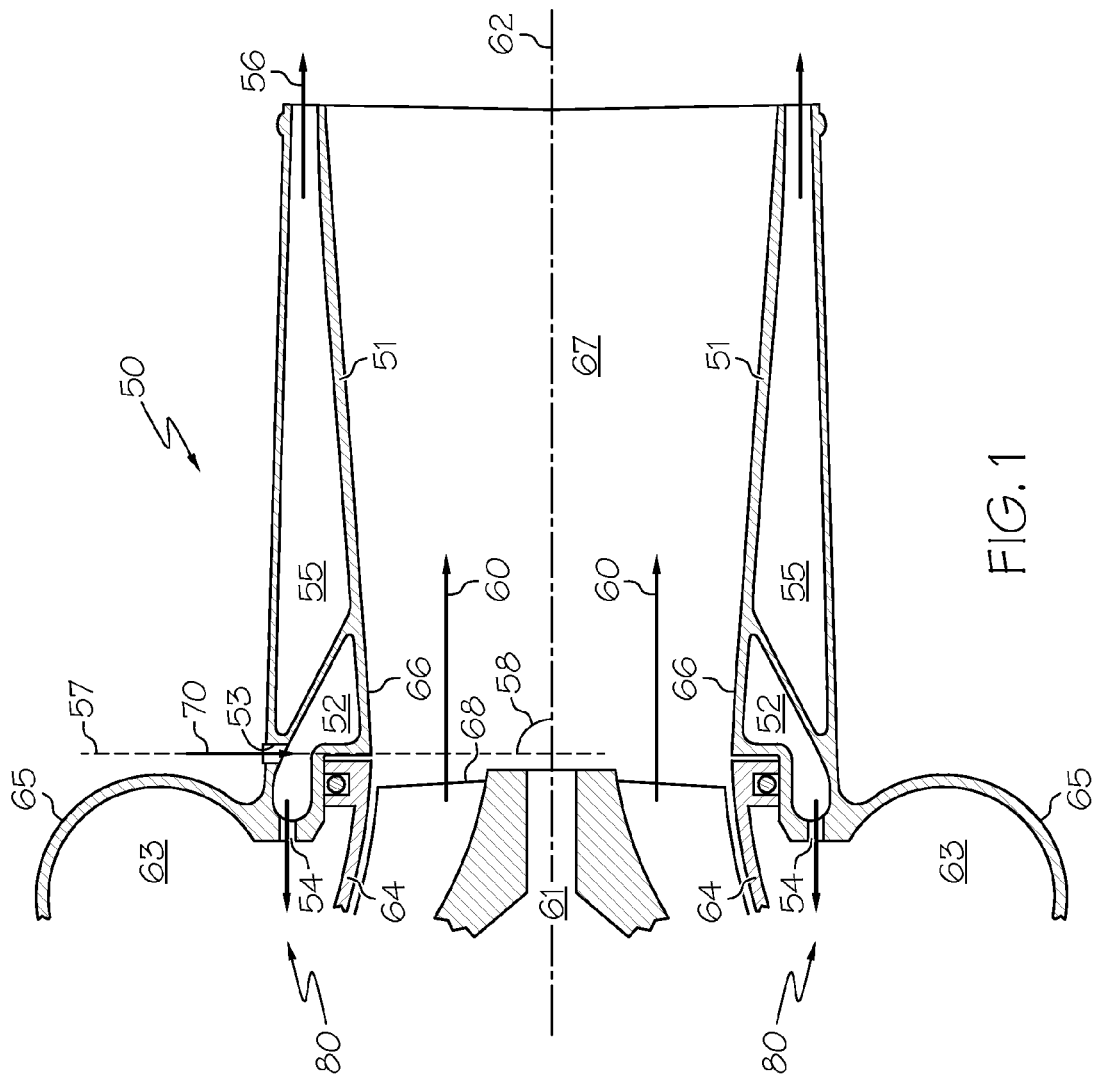
FIG. 1 is a cross section view of a turbine outlet heated diffuser according to one embodiment of the present invention installed on an air cycle machine comprising a radial turbine stage.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides turbine outlet heated diffusers and methods for reducing ice formation for a turbine. Embodiments of the present invention may find beneficial use in industries such as aerospace, automobile and electricity generation. Embodiments of the present invention may be useful in applications including environmental control systems, air conditioning systems and refrigeration systems. Embodiments of the present invention may be useful in any air conditioning application including, but not limited to, environmental control systems for aircraft.

In one embodiment, the present invention provides a turbine outlet heated diffuser for an air cycle machine (ACM). The turbine outlet heated diffuser may include a heated cavity positioned immediately downstream of the ACM turbine. The heated cavity may be designed to prevent ice formation at the turbine outlet by heating the diffuser wall. Unlike the prior art diffusers that include an immediate step as the flow exits the turbine wheel, embodiments of the present invention do not require a step. Unlike the prior art diffusers having a step, embodiments of the present invention do not result in a reduction of the turbine aerodynamic performance because of less than ideal turbine outlet geometry. In embodiments of the present invention, the step required by the prior art can be eliminated and an optimum turbine discharge can be constructed. Without the quick expansion loss due to the prior art step as the main ECS flow exits the turbine wheel, the overall turbine stage performance can be improved. The current invention may not need a step because the heated cavity can be fed with much hotter air (e.g. compressor discharge air) than in prior art applications using turbine inlet air. For embodiments of the present invention, the much hotter temperature may provide either a turbine outlet diffuser completely free of ice or a turbine outlet diffuser that has an ice growth (and then shedding) that occurs at a much-reduced thickness.

The heated cavity of the turbine outlet heated diffuser may be an annular cavity positioned around the outlet of the turbine. Unlike the prior art that requires complicated plumbing schemes, the heated cavity of an embodiment of the present invention can receive hot compressor discharge flow through a simple single flow line. Unlike some of the prior art that results in a significant expense to the thermodynamic performance of the ECS because it discharges the heated cavity flow directly into the turbine outlet, embodiments of the present invention can deliver flow from the heated cavity into the inlet plenum of the turbine where this flow can still be expanded through the turbine.

A turbine outlet heated diffuser 50 according to an embodiment of the present invention is shown in FIG. 1. The turbine outlet heated diffuser 50 may comprise a diffuser structure 51, cavity 52, at least one cavity inlet opening 53 and at least one cavity outlet opening 54. The cavity 52 may receive a supply of heated flow 70 and may provide a cavity outlet flow 80. The cavity outlet flow 80 may be directed to a turbine inlet plenum 63.

The diffuser structure 51 may be positioned downstream of a turbine 61. The diffuser structure 51 may comprise an outlet diffuser for the turbine 61. For some embodiments, the diffuser structure 51 may be easily added to an existing turbine scroll casting. For some embodiments, the diffuser structure 51 may be manufactured as an addition to the downstream end of a turbine scroll 65. The downstream end may be defined with respect to the direction of a turbine outlet flow 60 through the turbine 61. The diffuser structure 51 may be a structure that defines a flow path 67 for the turbine outlet flow 60.

For some embodiments, the cavity 52 may be integral to and defined by the diffuser structure 51. For some embodiments, the diffuser structure 51 may include a temperature control flow plenum 55 downstream of the cavity 52. The temperature control flow plenum 55 may comprise a conventional temperature control flow plenum. The temperature control flow plenum 55 may provide a temperature controlling flow 56 to the turbine outlet flow 60. For some applications, the temperature control flow plenum 55 may receive the temperature controlling flow 56 from the compressor inlet (not shown). The temperature control flow plenum 55 then may provide the temperature controlling flow 56 to the turbine outlet flow 60. The addition of the temperature controlling flow 56 may increase the temperature of the turbine outlet flow 60. For some applications, the temperature controlling flow 56 may be at zero during the most demanding cooling cases and a temperature control valve (not shown) may only open during operating cases where less than the maximum thermodynamic performance is needed.

The cavity 52 may be an annular cavity positioned radially outward from and around a turbine centerline 62. The cavity 52 may be positioned radially outward from and towards a turbine outlet 68. The cavity 52 may be a void designed to receive the heated flow 70. For some embodiments, the cavity 52 may be integral to the diffuser structure 51, as depicted in FIG. 1. In these embodiments, the cavity 52 may be defined by the diffuser structure 51. Alternatively, bolting or welding an additional structure, such as an annular wall plate (not shown), to the diffuser structure 51 may form the cavity 52. In these embodiments, at least a portion of the cavity 52 may be defined by the diffuser structure 51.

The cavity 52 may be heated by the heated flow 70 with the intent to keep the ice from sticking on the turbine outlet heated diffuser 50. The cavity 52 may be in thermal contact with the flow path 67 for the turbine outlet flow 60. The cavity 52 may be in thermal contact with a radially inner wall surface 66 of the diffuser structure 51. The radially inner wall surface 66 may be the surface facing toward the turbine outlet flow 60. The heated flow 70 may heat at least a portion of the radially inner wall surface 66. The cavity 52 and the supply of heated flow 70 may be designed to prevent ice formation on the turbine outlet heated diffuser 50 at an area towards the turbine outlet 68.

The cavity 52 may include the cavity inlet opening 53 and the cavity outlet opening 54. For some embodiments, the turbine outlet heated diffuser 50 may include one cavity inlet opening 53. Alternatively, the turbine outlet heated diffuser 50 may include more than one cavity inlet opening 53. For some of these embodiments, the cavity inlet openings 53 may be about evenly spaced circumferentially around the cavity 52. Although the number of cavity inlet openings 53 may vary with application, for some embodiments the number of cavity inlet openings 53 may be one.

The diameter of the cavity inlet opening 53 may depend on factors including the size of the air cycle machine and the flow requirements of the application. Although the diameter of the cavity inlet opening 53 may vary with application, for some embodiments the diameter of the cavity inlet opening 53 may be between about 0.50 inches and about 0.75 inches.

The cavity inlet opening 53 may be in flow communication with the supply of heated flow 70. The present invention may provide a simple plumbing and manufacturing approach. For example, for some embodiments, only a single external tube (not shown) from the compressor discharge to the cavity inlet opening 53 may be required for transporting the heated flow 70 to the cavity 52. Alternatively, the heated flow 70 may comprise a flow from another source, such as a primary heat exchanger inlet flow. For embodiments wherein the heated flow 70 comes from the primary heat exchanger inlet, the pressure differential to the turbine inlet plenum 63 would not be sufficient so this plumbing approach would require the flow exit be plumbed to another location in the ECS (e.g. compressor inlet). The temperature of the heated flow 70 may vary with application and may depend on factors including the composition of the heated flow 70. For example, when the heated flow 70 comes from the compressor discharge, the temperature of the heated flow 70 may be between about 250° F. and about 400° F.

The cavity inlet opening 53 may direct the heated flow 70 into the cavity 52. The heated flow 70 may flow into the cavity 52 about parallel to a cavity inlet centerline 57. For some embodiments, the cavity inlet centerline 57 may be about perpendicular to the turbine centerline 62. For these embodiments, the cavity inlet centerline 57 and the turbine centerline 62 may form an inlet angle 58 of about 90°. For other embodiments, the cavity inlet centerline 57 and the turbine centerline 62 may form an inlet angle 58 greater than or less than about 90° because of manufacturing and installation constraints, size of the turbine plenum, and locations of the interconnecting ECS ducting.

The cavity outlet opening 54 may be in flow communication with the turbine inlet plenum 63. The turbine inlet plenum 63 may be of either a scroll construction, as depicted in FIG. 1, or of a torus construction (not shown). In other words, the turbine inlet plenum 63 may comprise either the scroll or the torus type configuration. For embodiments comprising a scroll construction, the turbine inlet plenum 63 may be at least partially defined by a turbine shroud 64 and the turbine scroll 65. The turbine shroud 64 and the turbine scroll 65 may be positioned radially outward from and around the turbine 61. For some embodiments, the turbine scroll 65 may be integral to the diffuser structure 51. For some embodiments, the turbine outlet heated diffuser 50 may include one cavity outlet opening 54. Alternatively, the turbine outlet heated diffuser 50 may include more than one cavity outlet opening 54. For some of these embodiments, the cavity outlet openings 54 may be about evenly spaced around the cavity 52. Although the number of cavity outlet openings 54 may vary with application, for some embodiments the number of cavity outlet openings 54 may be between about one and about ten. For embodiments having one cavity outlet opening 54 and one cavity inlet opening 53, the cavity outlet opening 54 may be positioned about 180° from the cavity inlet opening 53 to ensure that the heated flow 70 migrates to all internal surfaces of the cavity 52 prior to exiting into the turbine inlet plenum 63.

For some embodiments, the cavity outlet opening 54 may be in flow communication with the turbine inlet plenum 63 and the cavity 52. The path from the cavity 52 into the turbine inlet plenum 63 may be through one or more simple drilled holes (cavity outlet opening 54) that allow the cavity 52 to communicate with the turbine inlet plenum 63. During operation, the heated flow 70 may enter the cavity 52 through the cavity inlet opening 53 and heat at least a portion of the radially inner wall surface 66 of the diffuser structure 51. After heating the radially inner wall surface 66, the heated flow 70 may exit the cavity 52 through the cavity outlet opening 54, thereby becoming the cavity outlet flow 80. The cavity outlet flow 80 may exit the cavity 52 through the cavity outlet opening 54. For some embodiments, the cavity outlet flow 80 may mix with main ECS flow in the turbine inlet plenum 63 thereby becoming part of the main ECS turbine inlet flow.

For other embodiments, in lieu of passing from the cavity 52 into turbine inlet plenum 63, the cavity outlet flow 80 may reenter someplace else in the ECS. This may be done by adding an exit tube (not shown) similar to the entrance tube mentioned above. The exit tube may be placed 180 degree from the entrance tube. Re-entry of this flow can happen in various places in the ECS—some with larger cycle performance penalties than others.

For some embodiments, the cavity outlet flow 80 may flow from the cavity 52 in a direction about parallel to the turbine centerline 62, as depicted in FIG. 1. For other embodiments, the cavity outlet flow 80 may flow from the cavity 52 at an angle (not shown) relative to the turbine centerline 62. The cavity outlet openings 54 may be sized to control and set the flow rate of the cavity outlet flow 80. The diameter of the cavity outlet opening 54 may vary with application and may depend on factors including the number of cavity outlet openings 54, the dimensions of the cavity 52, and the heating requirements of the application. For some applications, the diameter of the cavity outlet opening 54 may be between about 0.03 inches and about 0.15 inches. Testing and thermal analysis may be useful in determining the diameter and number of cavity outlet openings 54 for a particular application.

During operation, the delivery of the heated flow 70 to the cavity 52 should have minimal impact to the overall thermodynamic performance of the ECS. For some embodiments, the power consumed to provide the heated flow 70, for example the power consumed by the compressor, may not be totally lost to the cycle. For embodiments of the present invention, the heated flow 70 may comprise the cavity outlet flow 80 and may be recovered as it reenters at the turbine inlet plenum 63. The cavity outlet flow 80 then can be expanded through the radial turbine 61. For some embodiments, a small performance penalty may be expected because this flow (cavity outlet flow 80) has not been cooled in the ECS secondary heat exchanger. This is a common occurrence for the ACM embodiments that incorporate icing protection features. This small cycle penalty is deemed necessary to protect the ACM. For embodiments of the present invention, additional heat transfer losses out of the cycle are eliminated because any heat addition to the turbine outlet flow 60 may be exchanged as a heat reduction to the turbine inlet flow (not shown)—therefore there may be no net performance loss to the cycle due to this heat transfer.

Figure 2:
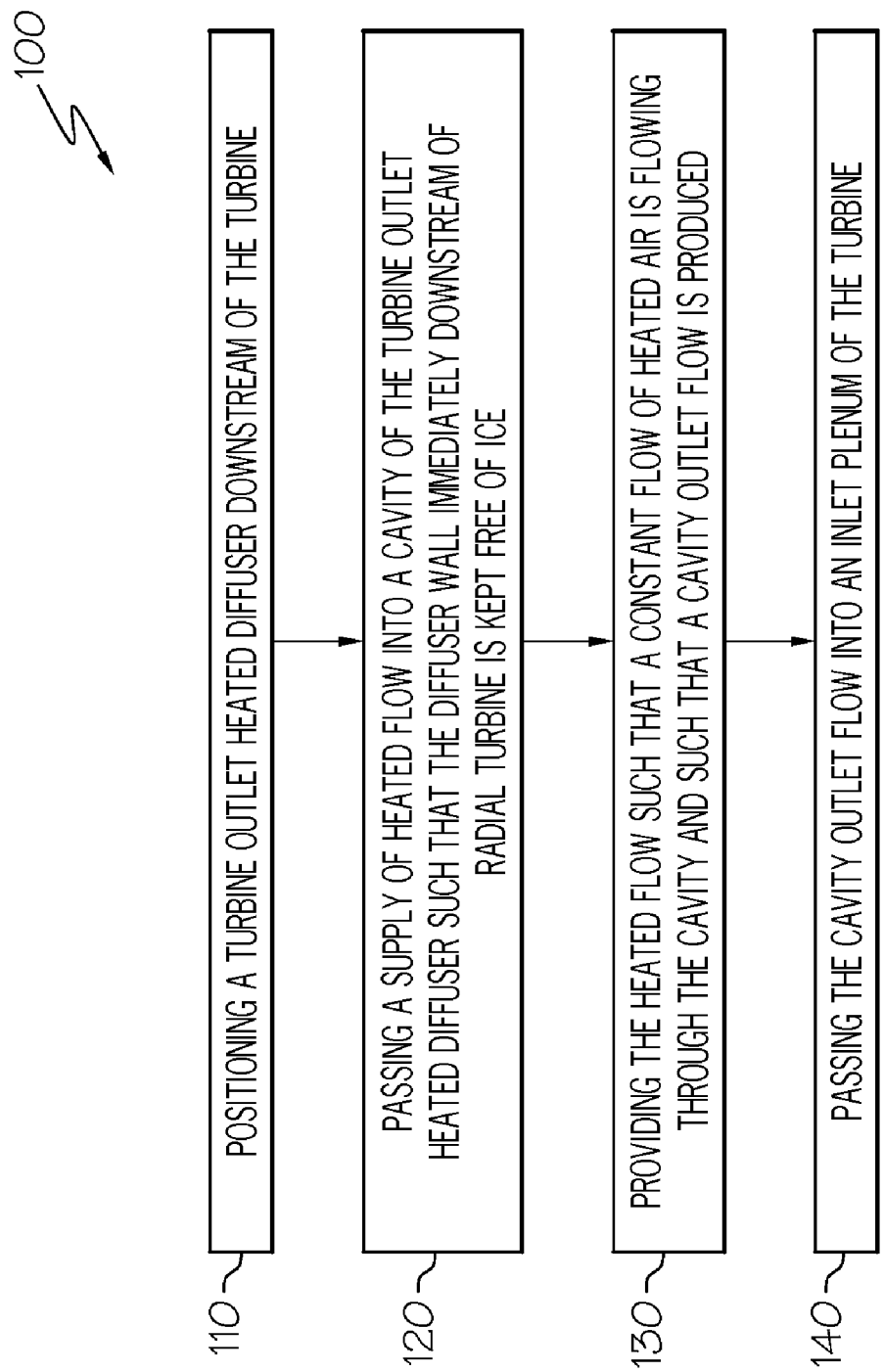
FIG. 2 is a flow chart of a method of reducing ice formation for a turbine according to an embodiment of the present invention.

A method 100 of reducing ice formation for a turbine 61 is depicted in FIG. 2. The method 100 may comprise a step 110 of positioning a turbine outlet heated diffuser 50 downstream of the turbine 61; a step 120 of passing a supply of heated flow 70 into a cavity 52 of the turbine outlet heated diffuser 50 such that the diffuser wall (radially inner wall surface 66) immediately downstream of the turbine 61 is kept free of ice; a step 130 of providing the heated flow 70 such that a constant flow of heated air is flowing through the cavity 52 and such that a cavity outlet flow 80 is produced; and a step 140 of passing the cavity outlet flow 80 into an inlet plenum 63 of the turbine 61.

The step 110 of positioning a turbine outlet heated diffuser 50 downstream of the turbine 61 may include forming the turbine outlet heated diffuser 50 integral to a scroll 65 of the turbine 61. The step 110 of positioning a turbine outlet heated diffuser 50 downstream of the turbine 61 may include positioning a cavity of the turbine outlet heated diffuser 50 radially outward from and towards an outlet 68 of the turbine 61.

The step 120 of passing a supply of heated flow 70 into a cavity 52 of the turbine outlet heated diffuser 50 may comprise directing a heated flow 70 from a compressor (not shown) to the cavity 52. The step 120 of passing a supply of heated flow 70 into a cavity 52 of the turbine outlet heated diffuser 50 may comprise passing the heated flow 70 such that at least a portion of a radially inner wall surface of the turbine outlet heated diffuser 50 is heated.

The step 140 of passing the cavity outlet flow 80 into an inlet plenum 63 of the turbine 61 may include passing the cavity outlet flow 80 through one cavity outlet opening 54. For some of these embodiments, the cavity outlet opening 54 may be biased in such a way that it is positioned about 180° from a cavity inlet opening 53. Alternatively, the step 140 of passing the cavity outlet flow 80 into an inlet plenum 63 of the turbine 61 may include passing the cavity outlet flow 80 through multiple cavity outlet openings 54 which may be about evenly spaced circumferentially around the cavity 52.

As can be appreciated by those skilled in the art, the present invention relates to turbine outlet heated diffusers. Embodiments of the present invention can eliminate the progression of the ice formation back into the radial turbine wheel. Embodiments of the present invention may provide heating at the ideal location to keep the ACM free from damaging turbine icing. For embodiments of the present invention, the geometry of the turbine outlet heated diffusers may not result in reduced turbine aerodynamic performance. Embodiments of the present invention can provide anti-ice protection while having minimal impact to the overall thermodynamic performance of the ECS.

It should be understood, of course, that the foregoing relates to exemplary embodiments of the invention and that modifications may be made without departing from the spirit and scope of the invention as set forth in the following claims.

I claim:

1. An apparatus for a turbine comprising:
    a diffuser structure;
    a cavity at least partially defined by said diffuser structure, said cavity positioned radially outward from and towards an outlet of said turbine;
    at least one cavity inlet opening in flow communication with said cavity; and
    at least one cavity outlet opening in flow communication with said cavity and an inlet plenum of said turbine, said cavity being downstream, in reference to turbine outlet flow, of said inlet plenum.

2. The apparatus of claim 1, wherein said turbine comprises an air cycle machine turbine; and wherein said cavity inlet opening is in flow communication with a compressor discharge of said air cycle machine.

3. The apparatus of claim 1, wherein said cavity inlet opening is positioned about 180° from said cavity outlet opening.

4. The apparatus of claim 1, wherein a diameter of said cavity inlet opening is between about 0.50 inches and about 0.75 inches.

5. The apparatus of claim 1, wherein at least one cavity outlet opening comprises between about one and about ten cavity outlet openings.

6. The apparatus of claim 1, wherein said diffuser structure is integral to said turbine inlet plenum of said turbine.

7. The apparatus of claim 1, wherein said cavity outlet opening has a diameter between about 0.03 inches and about 0.15 inches.

8. The apparatus of claim 1, wherein a centerline of said cavity inlet opening is about perpendicular to a centerline of said turbine.

9. The apparatus of claim 1, wherein said cavity is integral to said diffuser structure.

10. An apparatus for an air cycle machine comprising:
    an annular cavity positioned radially outward from a turbine of said air cycle machine;
    a fluid supply line positioned between and in flow communication with said annular cavity and a compressor discharge of said air cycle machine and
    a turbine inlet plenum,
    wherein said annular cavity includes at least one cavity outlet opening in flow communication with the turbine inlet plenum and the annular cavity is positioned downstream, in reference to turbine outlet flow, of the turbine inlet plenum.

11. The apparatus of claim 10, wherein said annular cavity includes a cavity inlet opening having a diameter between about 0.50 inches and about 0.75 inches.

12. The apparatus of claim 10, wherein said air cycle machine comprises an air cycle machine for an aircraft's environmental control system.

13. The apparatus of claim 10, wherein said annular cavity is integral to a diffuser structure of said air cycle machine; and wherein said diffuser structure is manufactured as an addition to a downstream end of a turbine scroll of said air cycle machine.

14. The apparatus of claim 10, wherein said annular cavity is integral to a diffuser structure of said air cycle machine; and wherein said diffuser structure is manufactured as an addition to a downstream end of a torus of said air cycle machine.

15. The apparatus of claim 10, wherein said annular cavity is in thermal contact with a flow path of said air cycle machine.

16. A method of reducing ice formation for a turbine comprising the steps of:
    positioning a turbine outlet heated diffuser downstream of said turbine;
    passing a supply of heated flow into a cavity of said turbine outlet heated diffuser such that at least a portion of a radially inner wallsurface of said turbine outlet heated diffuser is heated and such that a cavity outlet flow is produced; and
    passing said cavity outlet flow into an inlet plenum of said turbine.

17. The method of claim 16, wherein said step of passing a supply of heated flow into a cavity of said turbine outlet heated diffuser comprises directing said heated flow from a compressor to said cavity.

18. The method of claim 16, wherein said step of positioning a turbine outlet heated diffuser downstream of said turbine includes forming said turbine outlet heated diffuser integral to a scroll of said turbine.

* * * * *